(No Model.) 7 Sheets—Sheet 1.

C. R. SCHILLING.
WRAPPING MACHINE.

No. 546,193. Patented Sept. 10, 1895.

Attest:
Hebert Bradley.
Harry S. Rohrer.

Inventor:
Charles R. Schilling
by F. W. Ritter Jr
Atty (No Model.) 7 Sheets—Sheet 2.
C. R. SCHILLING.
WRAPPING MACHINE.

No. 546,193. Patented Sept. 10, 1895.

(No Model.) 7 Sheets—Sheet 4.

C. R. SCHILLING.
WRAPPING MACHINE.

No. 546,193. Patented Sept. 10, 1895.

Attest
Herbert Bradley
M. Darly

Inventor
Charles R. Schilling
by F. W. Ritter
atty (No Model.)

C. R. SCHILLING.
WRAPPING MACHINE.

No. 546,193. Patented Sept. 10, 1895.

Attest:
Herbert Bradley.
Harry B. Rohrer.

Inventor:
Charles R. Schilling
by F. W. Ritter Jr
atty

(No Model.) 7 Sheets—Sheet 6.

C. R. SCHILLING.
WRAPPING MACHINE.

No. 546,193. Patented Sept. 10, 1895.

Attest:
Herbert Bradley.
M. Darby.

Inventor:
Charles R. Schilling
by F. W. Ritter, Atty.

(No Model.)

C. R. SCHILLING.
WRAPPING MACHINE.

Patented Sept. 10, 1895.

Attest:
Herbert Bradley.
M. Darley.

Inventor:
Charles R. Schilling
by F. W. Ritter Jr. atty

UNITED STATES PATENT OFFICE.

CHARLES R. SCHILLING, OF ST. LOUIS, MISSOURI.

WRAPPING-MACHINE.

SPECIFICATION forming part of Letters Patent No. 546,193, dated September 10, 1895.

Application filed August 31, 1894. Serial No. 521,821. (No model.)

*To all whom it may concern:*

Be it known that I, CHARLES R. SCHILLING, a citizen of the United States, residing in the city of St. Louis, State of Missouri, have invented certain new and useful Improvements in Wrapping-Machines; and I hereby declare the following to be a full, clear, and exact description of the same, reference being had to the accompanying drawings, in which—

Fig. 3, Sheet 2, is an elevation of the machine from the front or feed-wheel side, parts broken away to show the mechanism which gives the final folds to the wrapper and the reciprocating discharge chute or guide. Fig. 4, Sheet 3, is an elevation of the machine from the opposite end or rear, parts broken away to show the arm and finger for returning the slide and crushing-tool to its first position after the paper has been divided. Fig. 5, Sheet 4, is an elevation of the machine from the drive-wheel side, parts broken away to show the wrapping-cylinder, the folding devices mounted thereon for giving the second and preliminary folds to the wrapper, the cam-rings for actuating the preliminary folding mechanism, and the mechanism for giving the final folds to the wrapper. Fig. 6, Sheet 5, is an elevation of the machine from the side opposite the drive-wheel, parts broken away to give another view of the mechanism shown in Fig. 5. Fig. 7, Sheet 4, is a detail view, partly in section, of the mechanism for feeding the wrapping-strip beneath the feed-wheel and the plunger for delivering the article to be wrapped from the feed-wheel to the wrapping-cylinder. (With Fig. 7, Fig. 43, Sheet 5, should also be considered, as it is a view of the crushing-disk for dividing the waxed paper, which disk lies below and just back of the plunger and travels transversely of the paper-feeding mechanism.) Fig. 8, Sheet 4, is a detail view of the eccentric and ratchet mechanism for actuating the upper set of feed-rollers which feed the strip of paper to the cutter and beneath the feed-wheel. Fig. 9, Sheet 4, is a sectional plan view of the mechanism shown in Fig. 7, taken on the line *a a* of Fig. 7. Fig. 10, Sheet 4, is a detail top or plan view of one set of the feed-rollers to show how the rollers are milled spirally and set at an angle to spread the wrapper as it leaves them, thus keeping it smooth and flat as it passes to the cutter and beneath the feed-wheel. Fig. 11, Sheet 3, is a detail sectional view of the cam, push-rod, and portion of shaft which actuates the pawl to release the wrapping-cylinders. (See also Figs. 2 and 3.) Fig. 12, Sheet 3, is a detail view of the mechanism for actuating the rock-shaft of the wrapping-cylinder at each stroke of the crank on the end of the main power-shaft opposite the fly-wheel. (See also Figs. 4 and 5.) Fig. 13, Sheet 3, is a detail view of a friction-brake for the hub of the wrapping-cylinder. (For relative location of said devices in the machine see Fig. 4.) Fig. 14, Sheet 6, is a detached enlarged view of the wrapping-cylinder and one cam-ring, as seen from the front of the machine. (See also Fig. 3, Sheet 2.) Fig. 15, Sheet 6, is a view of the near or front side of the wrapping-cylinder with folding mechanism secured thereon, the cam-ring of Fig. 14 having been removed. Fig. 16, Sheet 6, is a view of one side of the wrapping-cylinder, the folding-fingers having been removed. Fig. 17, Sheet 6, is a view of the rear cam-ring or that on the side next to the paper-feeding mechanism, Fig. 18, Sheet 6, is a view of the wrapping-cylinder and cam-rings, looking from above. Fig. 19, Sheet 6, is a similar view looking up from below or the devices reversed. Fig. 20, Sheet 6, is a view of the wrapping-cylinder and cam-rings, taken from the left-hand side of the machine (at right angles to Fig. 18) on the side opposite the drive-wheel. Fig. 21, Sheet 6, is a similar view taken from the right-hand side of the machine or the side next to the drive-wheel. Fig. 22, Sheet 6, is a vertical transverse sectional view of the wrapping-cylinder and cam-rings, the folding-fingers removed, taken on the line *b b*, Fig. 14. Figs. 23 to 29, Sheet 2, inclusive, are details of the discharge-chute, mechanism for reciprocating the discharge-chute, and for giving the last folds to the wrapper, as well as to pull the wrapped article from the wrapping-cylinder and enter it in the reciprocating discharge-chute. (For location of said devices in the machine see Figs. 3, 5, and 6.) Figs. 30, 31, 32, and 33, Sheet 2, and Figs. 34, 35, 36, and 37, Sheet 5, are details of mechanism for actuating the flexible end or blade which controls the final fold of the wrapper. (For location of parts in the machine see Fig. 3, Sheet 2.) Figs. 39 and 40, Sheet 5, are sectional views of the bed-plate, the feed-wheel, and the means for locking the feed-wheel in position during the operation of the feed-plunger. Fig. 41, Sheet 5, is a sectional view on the line $c\,c$, Figs. 39 and 40, showing the pawl mechanism for rotating the feed-wheel. (See, also, Fig. 2 for location of said parts in the machine.) Fig. 42, Sheet 5, is a detached view of the locking-pin of the feed-wheel with sectional view of the wedge which withdraws it. Fig. 43, Sheet 5, is a transverse vertical section of the bed-plate between the feed-wheel and circular crushing-disk, showing the crushing disk or tool which divides the paper and the spring presser-plate. (This view, Fig. 43, should be read with Figs. 2, 7, and 9.) Figs. 44 and 45, Sheet 5, are sections on the line $d\,d$, Fig. 6, same sheet, showing a spring-pin for controlling the spring-lever on the drive-wheel to prevent shock to the machinery. Diagrams 46 to 54, inclusive, Sheet 7, illustrate the several steps of the folding operation or the folds as made by the folding mechanism.

Like symbols refer to like parts wherever they occur.

My invention relates more especially to that class of machines employed for wrapping various articles of merchandise—such as candy, soap, or like articles—having uniform size and shape, and while the machine as organized embraces the following distinct mechanisms—to wit, mechanism for feeding a strip or continuous length of paper, mechanism for severing the paper into suitable sizes for wrappers, mechanism for placing the article within the wrapper and feeding the wrapper to the folding or wrapping mechanism, folding or wrapping mechanism, and means for receiving the wrapped article and discharging the same regularly into suitable receptacles, if desired—yet I desire it to be clearly understood that each of said mechanisms, in so far as the same may be of general utility, is not to be taken as limited in its use to this particular organism when considered as a whole.

For the purposes of a wrapping-machine the several mechanisms are combined in order, as hereinbefore specified, and the detailed description will follow said order, first pointing out in each the prominent features of invention, and finally summing up in the claims the particular combinations of elements and features of construction which I desire to protect by Letters Patent.

First. To avoid shock and undue strain on the mechanism as a whole I journal the drive-wheel loosely on the main shaft and impart the power to the shaft by means of an intervening yielding driving mechanism embracing a spring-lever mounted on the drive-wheel which engages an arm or projection on the shaft, the reaction of said intermediate driving mechanism being controlled by a spring buffer or pin (see Fig. 5) which, or its equivalent, embodies one feature of my invention.

Figure 1:
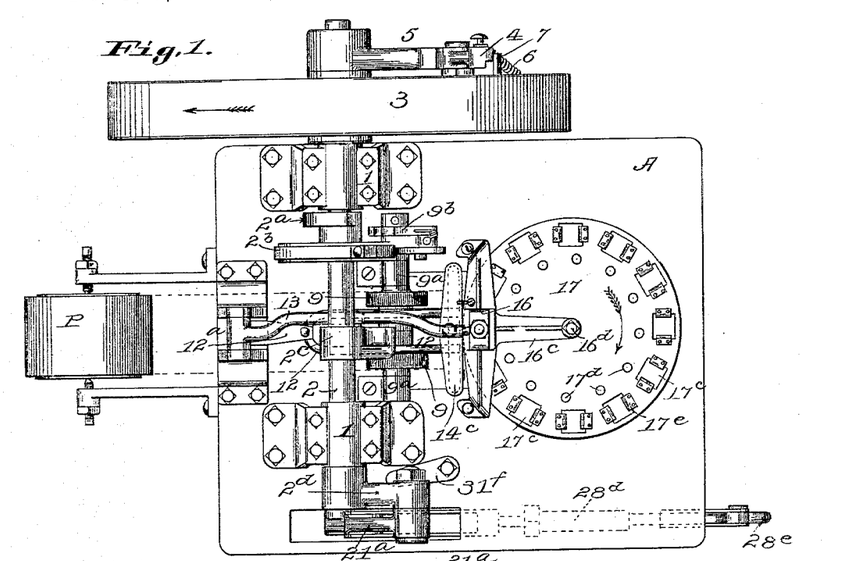
Figure 1, Sheet 1, is a top plan view of a machine embodying my invention.
Figure 2:
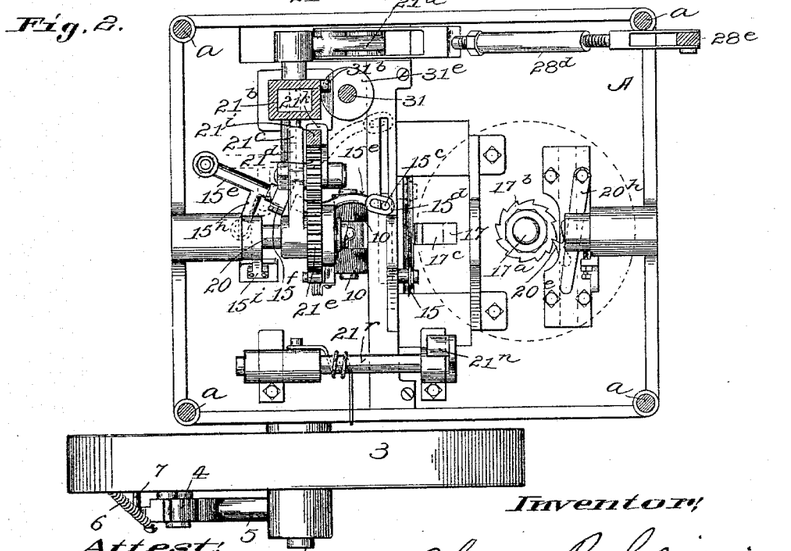
Fig. 2, Sheet 1, is a horizontal sectional view taken below the bed-plate to expose the mechanism which actuates the tool for dividing the paper during its crushing operation and also the mechanism which rotates the feed-wheel, looking from below upward.

Second. Where waxed paper is used as a wrapper, as in the case of caramels, in order to keep the wax from caking and to insure a smooth flat feeding of the paper I mill the feed-rolls spirally (preferably with fine teeth, one hundred to the inch, more or less,) and arrange one set of the rolls at an angle to each other and parallel to the bed-plate of the machine, (see Figs. 1, 2, and 10,) which, or its equivalent, embodies a second feature of my invention.

Third. In order to prevent the accumulation of wax on the cutter and the clogging thereof, which is liable to occur in cases where a shear or draw cut is made, I combine with a reciprocating dull-edge crushing-disk a yieldingly-supported presser-plate arranged in line and coacting with the crusher-disk, and means for bringing the yieldingly-supported presser-plate into action with the dull-edge crushing-disk, and such a construction or its equivalent embodies a third feature of my invention.

Fourth. In order to simplify and render accurate the folding mechanism I provide peripheral slides, on which are mounted tucker-fingers movable with the slide, and I pivot the folding-fingers on the rotating folding-cylinder and actuate them by two inclosing annular plates having cam-grooves or cam-rings, (see Figs. 14 to 22, Sheet 6, inclusive,) which embody a fourth feature of my invention.

Fifth. In order to receive and discharge the wrapped article and to hold the final fold after the retraction of the blades which make the said fold, I provide a movable chute and a flexible blade which reciprocates across the mouth of the chute, (see Figs. 3, 31, 32, and 33, Sheet 2,) which, or their equivalents, embody a fifth feature of my invention.

There are other combinations and details of construction embodying further points of invention, all as will hereinafter more fully appear.

I will now proceed to describe my invention more fully, so that others skilled in the art to which it appertains may apply the same.

In the drawings, A indicates the bed-plate supported on a base-plate B by suitable uprights $a$, the base-plate B being in turn suitably supported to accommodate such portions of the apparatus as project below the same.

In suitable bearings 11, erected on the bed-plate A or table is journaled a main shaft 2, on which shaft is loosely journaled the drive-wheel 3. Pivoted on the drive-wheel 3 is a lever 4, (see Figs. 5 and 6,) one arm of which is arranged to engage an arm 5 secured to the end of main shaft 2 by a hub and set-screw, or in any other suitable manner. The inner end of lever 4 (see Fig. 5, Sheet 4) is preferably curved, as shown, to prevent running the machine in the wrong direction, and the opposite arm of pivoted lever 4 is held by a spring 6, secured to the drive-wheel and rests against a stop-pin 6. By this driving mechanism the main shaft is yieldingly driven, so as to be released, and thus insure the safety of the machinery in case the movement of the shaft is too heavy or obstructed. In order to prevent the blows or shocks to the machine which would arise when the lever 4, owing to the yielding of its spring 6, was allowed to pass the arm 5 secured to the shaft, I provide the drive-wheel adjacent to the spring-arm of lever 4 with a spring pin or plunger 8, (see Fig. 5, Sheet 4, Figs. 44 and 45, Sheet 5,) which arrests the lever and thus prevents the return or blow of the lever 4 when the said lever has advanced beyond its normal position, and I also provide the spring pin or plunger 8 with a lever by which it can be drawn back to its normal position to release the lever 4 and allow it to return to its normal or working position.

Secured to the main shaft 2 in the order named (see Fig. 1, Sheet 1) are, first, a cam $2^a$, which releases the wrapping-cylinder; second, an eccentric $2^b$, (see Fig. 1, Sheet 1, and Fig. 8, Sheet 4,) which actuates the feed-rollers for feeding the wrapper-strip; third, a double cam $2^c$, (see Fig. 1, Sheet 1, and Fig. 7, Sheet 4,) which actuates the feed-plunger and the presser-plate which supports the paper-strip during the operation of the circular crushing-tool, and, fourth, a crank-arm $2^d$, (see Fig. 1, Sheet 1, Fig. 4, Sheet 3, and Fig. 6, Sheet 5,) which through suitable intermediate mechanism actuates the crushing-disk 15, the wrapping-cylinder, the reciprocating discharge-chute, and the holding-blade, all as will hereinafter appear.

The first mechanism in the order of operation is that for feeding the paper and consists in a spindle properly supported upon the machine by brackets for carrying a continuous roll P of suitable width for the required wrapper. From said roll P the paper passes over bed-plate A, under a spring-tongue $p$, (see Figs. 7 and 9, Sheet 4,) thence between the upper and lower sets of feed-rolls 9 9 and 10 10. These feed-rollers (see Figs. 1 and 2, Sheet 1, Fig. 7, Sheet 4, and Fig. 10, Sheet 4) are preferably cut with fine teeth, one hundred to the inch, spiral, and in such a way that the opposing rolls will mesh with each other just as a gear-wheel does, only in a less degree, the teeth being much smaller. The upper rolls 9 9 are journaled in suitable bearings $9^a$ $9^a$ on the bed-plate A (see Fig. 1, Sheet 1, and Fig. 9, Sheet 4) and are driven from the main shaft 2 through eccentric $2^b$, its strap, and the pawl-and-ratchet mechanism $9^b$, and the lower rolls 10 10 are journaled in suitable vertically-movable bearings beneath the bed-plate A and are held in frictional contact with the paper and upper rolls by a suitable spring or springs, as at 11, Fig. 7, Sheet 4, which yieldingly support said movable bearings. Where the usual plain-faced feed-rolls are employed for feeding waxed paper, commonly used in wrapping caramels and like articles, the bite of the feed-roll being continuous or uninterrupted transversely of the line of feed the wax or equivalent covering of the paper is indented and forced back under the pressure, so as to recede and accumulate or cake behind the feed-rollers. By milling the rolls, as hereinbefore specified, the wax or equivalent covering of the wrapper (where such paper is used for wrappers) is divided and forced out along the spiral, thus avoiding the caking which occurs (and is highly objectionable) where smooth-faced feed-rolls are employed. In order to feed the paper flat and smoothly, the rolls are inclined to each other, as indicated in Fig. 10, Sheet 4.

Journaled in suitable bearings on bed-plate A, back of feed-rolls 9 9 and 10 10 and directly beneath the double cam $2^c$ of shaft 2, so as to be acted on by said cam, and in substantially the same vertical plane (see Fig. 1, Sheet 1, and Fig. 7, Sheet 4) are two levers 12 and 13, each provided with a friction-roller for engagement with a part of cam $2^c$. The first, or 12, is held or supported with yielding pressure by a leaf-spring $12^a$, and carries at its outer end the spring-supported presser-plate 14, (see Fig. 7, Sheet 4, and Fig. 43, Sheet 5,) which under the action of cam $2^c$ forces the paper down on the circular rotary crushing-disk 15 (hereinafter to be described) and coacts with said cutter in severing the wrapper from the continuous strip.

Figures 4, 11, 12, 13:
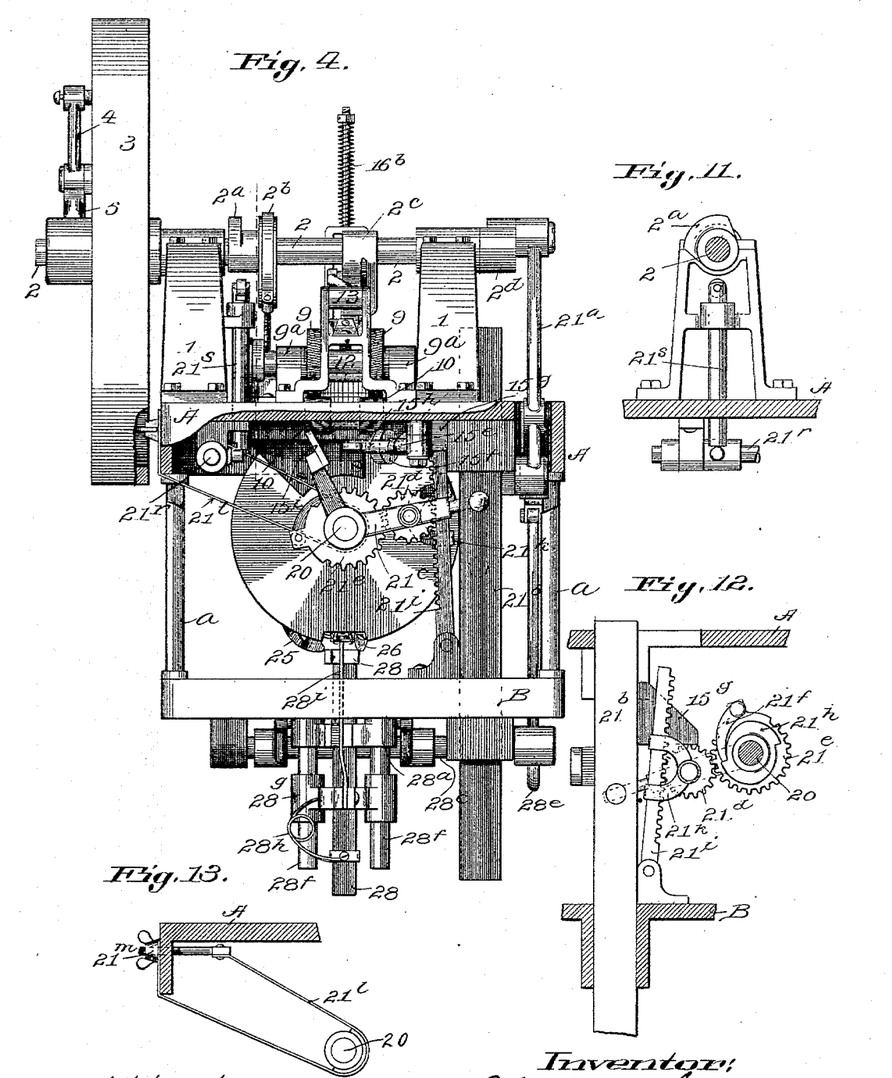
Figures 5, 7, 8, 9, 10:
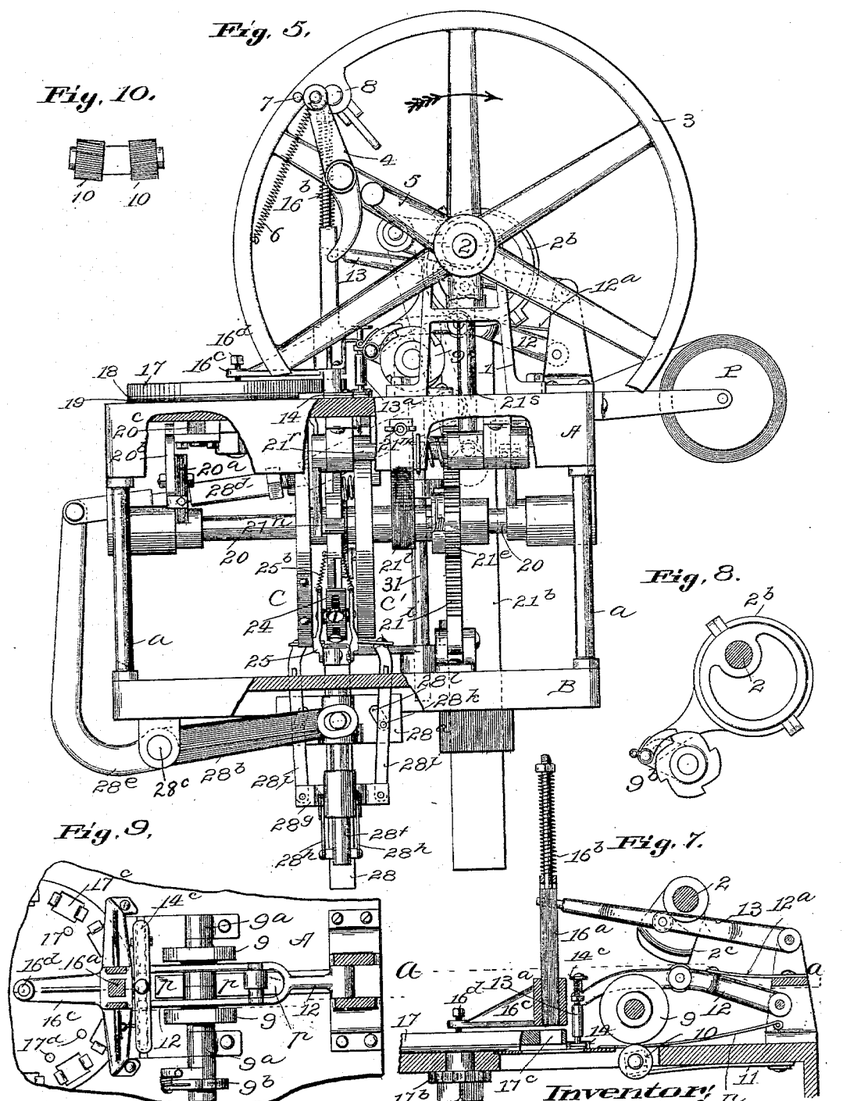
Figures 6, 34, 35, 36, 37, 39, 40, 41, 42, 43, 44, 45:
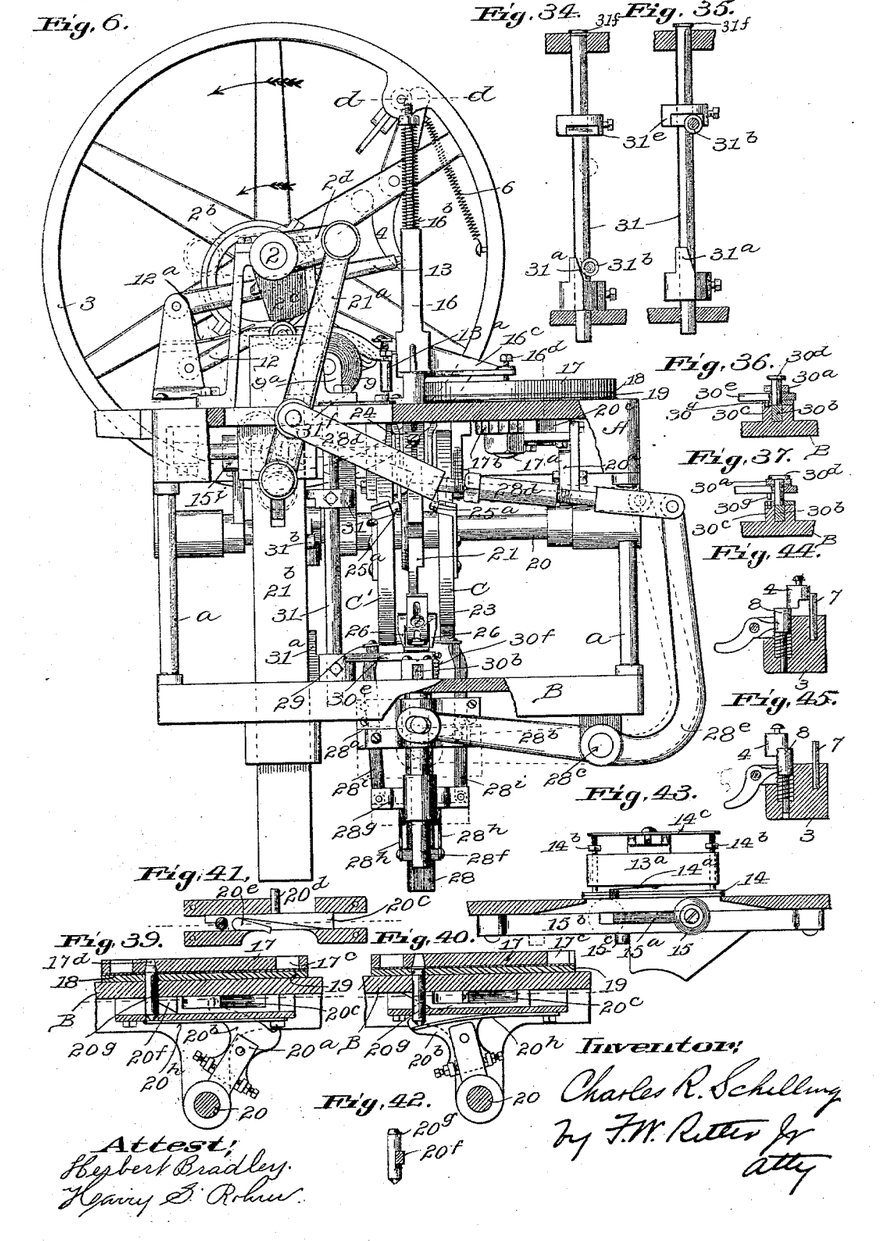
Figure 14:
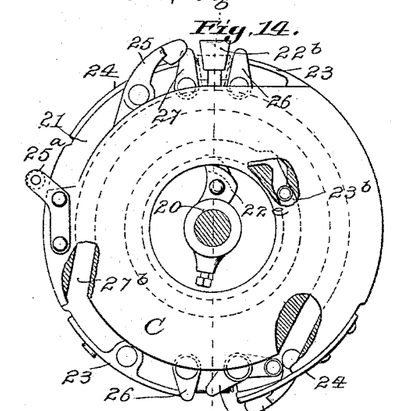
Figure 15:
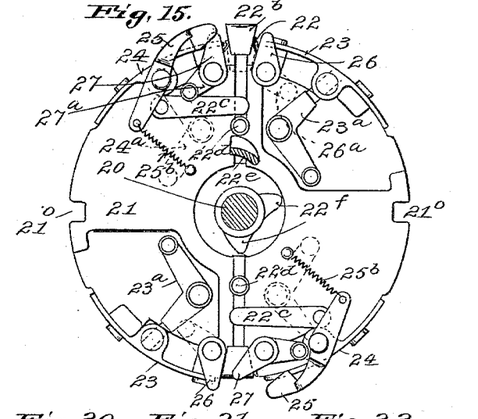
Figures 16, 17, 18, 19, 20, 21, 22:
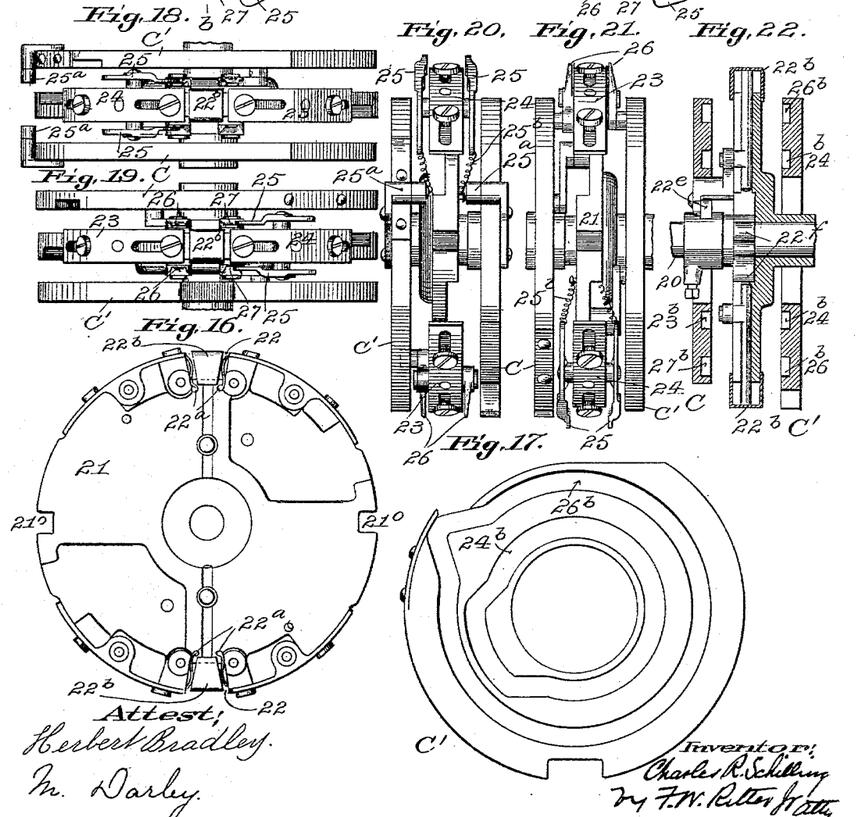

The preferred construction of the spring presser-plate 14 is that shown in Figs. 7 and 43—that is to say, the pivoted arm 12 terminates in a cross-bar $13^a$ pierced vertically at its ends for two threaded bolts, to the lower ends of which is affixed the presser-plate 14, between which and the cross-bar is a leaf-spring $14^a$, while nuts $14^b$ regulate the drop of the plate 14, and a supplemental tension-spring $14^c$ may bear on the upper end of said bolts, if desired. The leaf-spring $14^a$ has its end which bears on presser-plate 14 turned down to form projections $14^d$, (see Fig. 43, Sheet 5,) one projection on each side of the presser-plate 14, and said projections serve to prevent the sliding of the paper when the presser-plate 14 rises or recedes during the operation of cutter 15. To facilitate this operation of the projections $14^d$ they may, if desired, be tipped with leather or its equivalent. This presser-plate 14 stands over a transverse slot in the bed-plate A, (see Fig. 2, Sheet 1,) through which projects the circular rotary crushing-disk 15 for one thirty-second of an inch, more or less, and said slot is adjacent to the periphery of the feed-wheel. This disk 15 is not, properly speaking, a cutter, for if constructed with a true cutting-edge it would gather wax and become clogged in a short time. It is therefore provided with a dull edge, which enables it to crush through the wax and paper, dividing the same by crushing force and without accumulating wax to impede the operation of the tool. The rotary disk or crushing-tool 15 (see Fig. 2, Sheet 1, and Fig. 43, Sheet 5) is carried by a pin on a reciprocating slide or bar 15$^a$, which bar moves transversely of the paper-feed in a guide 15$^b$ adjacent to the disk-slot in the bed-plate A, and said bar has a pin 15$^c$, which enters an elongated slot or eye 15$^d$ (see Fig. 2, Sheet 1) on one end of a pivoted lever 15$^e$, the lever 15$^e$ having on it a friction-roller 15$^f$ (see, also, Fig. 4, Sheet 3,) that is struck by a cam 15$^g$ on the vertically-reciprocating slide 21$^b$ (see Fig. 12, Sheet 3, and dotted line, Fig. 4, Sheet 3) on the ascent of said slide-bar 21$^b$ to give the travel to said slide-bar 15$^a$ and disk 15. The return stroke of the rotary disk 15 is effected by means of a short arm 15$^h$ on pivoted lever 15$^e$, which is in turn struck by a tappet-finger 15$^i$, (see Fig. 4, Sheet 3,) secured to an arm attached to the rock-shaft 20, on which the wrapping-cylinder is mounted.

By the above-disclosed mechanism the rotary disk 15 is advanced and retracted as specified.

The disk is the preferred form for the tool, and the presser-plate which supports the paper is preferably the yielding element of the combination, but it will be evident to one skilled in the art that another form of vibrating tool may be substituted for the disk and the parts reversed, making the traveling member the yielding element of the combination.

Straddling that part of the periphery of the feed-wheel just in front of the above-mentioned disk-slot is a guide-bracket 16 (see Figs. 1, 3, 6, 7, and 9) for the spring-ram or feed-plunger 16$^a$, said plunger 16$^a$ being operated by the spring 16$^b$ and the pivoted arm 13 by the cam 2$^c$, hereinbefore described. Extending forward from guide-bracket 16 is an arm 16$^c$, in which is a centering pin or screw 16$^d$ for the feed-wheel 17.

17 indicates the feed-wheel, which occupies the front portion of the bed-plate A diametrically in line with the feed of the wrapper-strip or the paper-feed mechanism and rotates horizontally on its center pin or journal 17$^a$, which projects through the bed-plate A (see Fig. 2, Sheet 1) and carries a ratchet-wheel 17$^b$, by means of which said feed-wheel is intermittently rotated by mechanism which will be hereinafter described. The feed-wheel 17 has a series of pockets 17$^c$ (see Fig. 1, Sheet 1) arranged in a circle near its periphery, so that each pocket shall successively register with the feed-ram or feed-plunger 16$^a$ and with a passage in the bed-plate A over the wrapping-cylinder. Adjacent to each of said feed-pockets 17$^c$ is a pin-opening 17$^d$, preferably tapered to receive a locking-pin, which arrests and holds the feed-wheel during the operation of the feed plunger or ram, and each of said pockets 17$^c$ is provided with light spring-tongues 17$^e$, adapted to hold the article to be wrapped, cause it to travel with the feed-wheel, and be properly presented to the feed-ram 16$^a$. Immediately beneath the feed-wheel is a sheet of zinc 18 (see Figs. 39 and 40, Sheet 5) or equivalent smooth material on which the feed-wheel rests and rotates, said sheet 18 having an opening beneath the plunger—one for the locking-pin and another for the step or journal of the feed-wheel—said openings over like openings in the bed-plate. Between the sheet of zinc 18 and the bed-plate A a distance-piece 19 is inserted, cut away at the rear (see Fig. 5, Sheet 4) to allow for and facilitate the insertion of the wrapper beneath the feed-wheel 17, where a pocket registers with the feed-ram 16$^a$. The feed-wheel 17 and its adjuncts above described are operated from the rock-shaft 20, which carries the wrapping-cylinder, by the following intermediate mechanism: Upon the wrapping-cylinder rock-shaft 20 (see Fig. 5, Sheet 4) is a short arm 20$^a$, (see Figs. 39 and 40, Sheet 5,) provided with an adjustable finger 20$^b$, which actuates a slide 20$^c$ by engaging a pin 20$^d$ thereon. (See Fig. 41, Sheet 5.) The slide 20$^c$ carries a spring-pawl 20$^e$, (for sake of clearness spring of pawl has been omitted,) and said spring-pawl 20$^e$ engages the ratchet-wheel 17$^b$ (see Fig. 2, Sheet 1) on the journal 17$^a$ of the feed-wheel 17. The adjustable finger 20$^b$ is in the form of a pivoted or swinging arm, which is or may be adjustably clamped to short arm 20$^a$ by two or more set-screws, as shown in Figs. 39 and 40, Sheet 5. The slide 20$^c$ above referred to carries a wedge 20$^f$, which engages a notch in locking-pin 20$^g$ (see Figs. 39, 40, and 42, Sheet 5) and withdraws said pin from the pin-hole 17$^d$ of feed-wheel 17, thus releasing the feed-wheel at the instant the power to rotate it is applied. The pin 20$^g$ rests against the under surface of the feed-wheel during the rotation thereof and is forced into the next pin-hole to lock the plate during the operation of feed-ram 16$^a$ by a spring 20$^h$ or equivalent means.

The wrapping-cylinder 21 (see Figs. 3, 4, 5, and 12 for location, arrangement, and operation, and Figs. 14 to 22, Sheet 6, for detail of folding mechanism) is loosely mounted by means of a sleeve-hub on rock-shaft 20 and is caused to revolve intermittently around the shaft by the following mechanism: To the crank 2$^d$ on the end of shaft 2 (see Figs. 4, 6, and 12) is pivoted a lever or link 21$^a$, the opposite end of said link being pivotally connected with a vertically-reciprocating slide-bar 21$^b$, and said slide is connected by rock-arm 21$^c$ with the rock-shaft 20, on which the wrapping-cylinder is loosely mounted. Journaled on a pin which projects from said rock-arm 21$^c$ is a pinion 21$^d$, which meshes with a larger gear-wheel 21$^e$, loose on rock-shaft 20, and said gear-wheel 21$^e$ carries a pawl 21$^f$, which engages a ratchet-wheel 21$^h$, fast on the sleeve or hub of the wrapping-cylinder, motion being imparted to the first-named pinion $21^d$ by a rack-bar $21^i$, pivoted on the base-plate B and held in working contact with said pinion by a bracket-guide $21^k$, carried by the pin on which the pinion $21^d$ is journaled.

The operation of the combination of elements last described results in one-half revolution of the wrapping-cylinder. As the upward stroke of vertically-reciprocating slide-bar $21^b$ through intermediate pinion $21^d$ rotates gear-wheel $21^e$ (which is loose on rock-shaft 20) a little more than one-half revolution, which carries the pawl $21^f$ an equal distance, the return or down stroke of the slide $21^b$ and rock-arm $21^c$ must cause the wrapping-cylinder to make one-half revolution on the rock-shaft 20.

For the purposes of the apparatus shown in the drawings and chosen for illustration, as only two sets of folding mechanism and two pockets are used, a half-revolution of the wrapping-cylinder is all that is required; but it will be plain to one skilled in the art that the above-described gearing may be readily modified to obtain any required fractional rotation of the wrapping-cylinder.

In order to control and steady the wrapping-cylinder 21, I provide a brake-strap $21^l$ (see Figs. 4 and 13, Sheet 3) and tightening-nut $21^m$, and to arrest the motion of the wrapping-cylinder and hold it during the feed operation I provide a pawl or dog $21^n$, (see Fig. 3, Sheet 2,) that engages a quarter-notch $21^o$ (see Figs. 15 and 16, Sheet 6) in the periphery of the wrapping-cylinder, said pawl or dog $21^n$ being attached to a spring-actuated rock-shaft $21^r$, (see Fig. 2, Sheet 1,) which is actuated in a reverse direction by cam $2^a$ on main shaft 2 through a vertical push-rod $21^s$, (see Fig. 11, Sheet 3,) acting on a pin to rock said spring-shaft $21^r$ and retract pawl $21^n$ at the proper time.

Figures 46, 48:
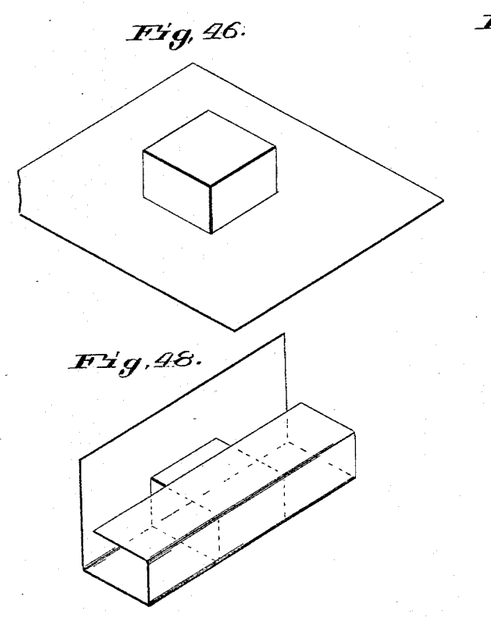
Figure 47:
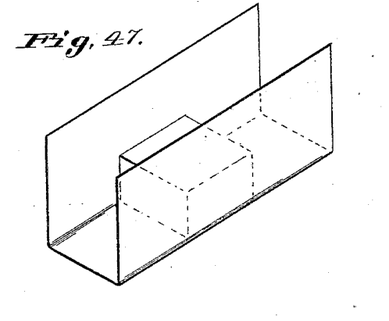
Figure 49:
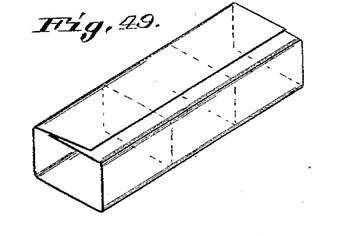
Figures 50, 51:
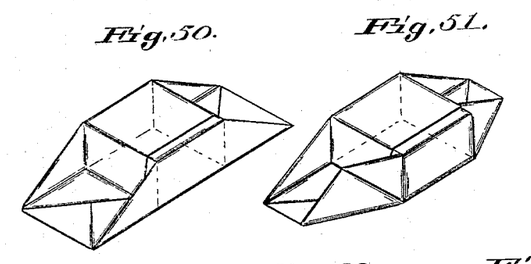
Figure 52:
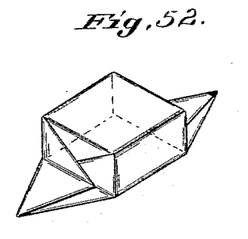
Figure 53:
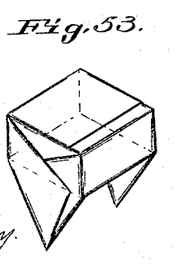

The wrapping-cylinder 21, (see Figs. 14 to 22, Sheet 16, inclusive,) loosely mounted and rotated on rock-shaft 20, as aforesaid, has the following particular construction (or its equivalent) to effect the several folds, except the final fold: At diametrically-opposite points in the periphery of the cylinder are pockets 22 22, each of which has spring or yielding sides $22^a$ and a yielding bottom $22^b$, the latter having a stem extending radially of the wrapping-cylinder, which stem is frictionally held by a flat spring $22^c$ (or its equivalent) and is provided with a roller $22^d$, (see Fig. 15, Sheet 6,) which is struck by a cam $22^e$ on the rock-shaft 20 (see Fig. 14) just as the pocket 22 comes under the ram $16^a$ to lift the movable bottom $22^b$ up to meet the wrapper and caramel (or other article) to hold them between the bottom of the ram and the yielding bottom $22^b$. At the opposite position or discharge (see Fig. 15) the end of the stem which carries the movable bottom $22^b$ is struck by the tappet $22^f$ on the rock-shaft 20 and forced out to the periphery of the wrapping-cylinder to discharge the caramel (or other article) and also to bring the roller $22^d$ within the reach of cam $22^e$ on rock-shaft 20. By this mechanism the yielding bottom of the pocket is made to rise to receive the wrapper and article to be wrapped and allowed to recede gradually before the article on the descent of ram or feed-plunger $16^a$. This operation leaves the article in the pocket of the wrapping-cylinder with the wrapper on three sides thereof, as indicated in the diagram Fig. 47, Sheet 7. Arranged on the periphery of the wrapping-cylinder 21, and adjacent to each pocket 22, are two slides 23 and 24, which operate in the order named and project over the mouth of pocket 22. The first of said slides 23 is actuated by the pivoted arm $23^a$ and the cam-track $23^b$ (see Figs. 14 and 15) and gives the first fold to the wrapper, as indicated in diagram Fig. 48, Sheet 7, while the second 24 is operated in reverse direction by the pivoted arm $24^a$ and cam-track $24^b$, Fig. 17, and gives the second fold to the wrapper, as indicated in Diagram 49, Sheet 7, leaving the wrapper on four sides of the article. The next step, or third fold, is to break down or tuck the wrapper at the ends of the article, and this is accomplished by the two tucker-fingers 25 25, one working on each side of the wrapping-cylinder and preferably in the form of levers pivoted on the slide 24, brought into operation by the lugs $25^a$ $25^a$ on the cam-rings and retracted by the tail-springs $25^b$, or equivalent means. These fingers 25 25, it will be noted, operate toward the center of rotation of the wrapping-cylinder and form the third or end folds shown in Diagram 50, Sheet 7. The fourth step or fold (see diagram Fig. 51, Sheet 7) is made by two fingers 26 26, (one for each side of the wrapping-cylinder or end of the package,) pivoted near one inner corner of pocket 22 and actuated across the end of the pocket and article therein by arm $26^a$ and cam-track $26^b$, Fig. 17, after which the folding-fingers 26 recede and the fifth fold (shown in Diagram 52, Sheet 7) is made by like fingers 27 27, pivoted near the opposite inner corner of the pocket 22 and operated across the ends of the pocket by arm $27^a$, Fig. 15, and cam-track $27^b$, Fig. 14. This is the last fold of the wrapper made by the wrapping-cylinder.

The cam-tracks $23^b$ $24^b$ $26^b$ $27^b$ and lugs $25^b$, hereinbefore referred to, are located in and on the annular cam-disks or cam-rings C C', (see Figs. 14, 17, 18, 19, 20, 21, and 22, Sheet 6,) which surround the rock-shaft, inclose the wrapping-cylinder, and are rigidly supported from the bed-plate A, as shown in Fig. 4, Sheet 3.

During the several steps and the operation of the devices, as last above described, the wrapping-cylinder has been moving and has made a half-revolution, thus bringing the pocket 22 and wrapped article therein opposite to its first position, at which time the tappet $22^f$ on rock-shaft 20 has struck the stem of movable bottom $21^b$ and forced the article from the pocket into the upper open end of the reciprocating chute. (See Figs. 5 and 6.) As entered in the mouth of the reciprocating-chute the wrapped article will appear, as shown in Diagram 53, Sheet 7, reversed. While in the last-mentioned position the final fold is given to the wrapper (to give it the appearance indicated in diagram Fig. 54) by mechanism to be next described.

Figures 3, 23, 24, 25, 26, 27, 28, 29, 30, 31, 32, 33:
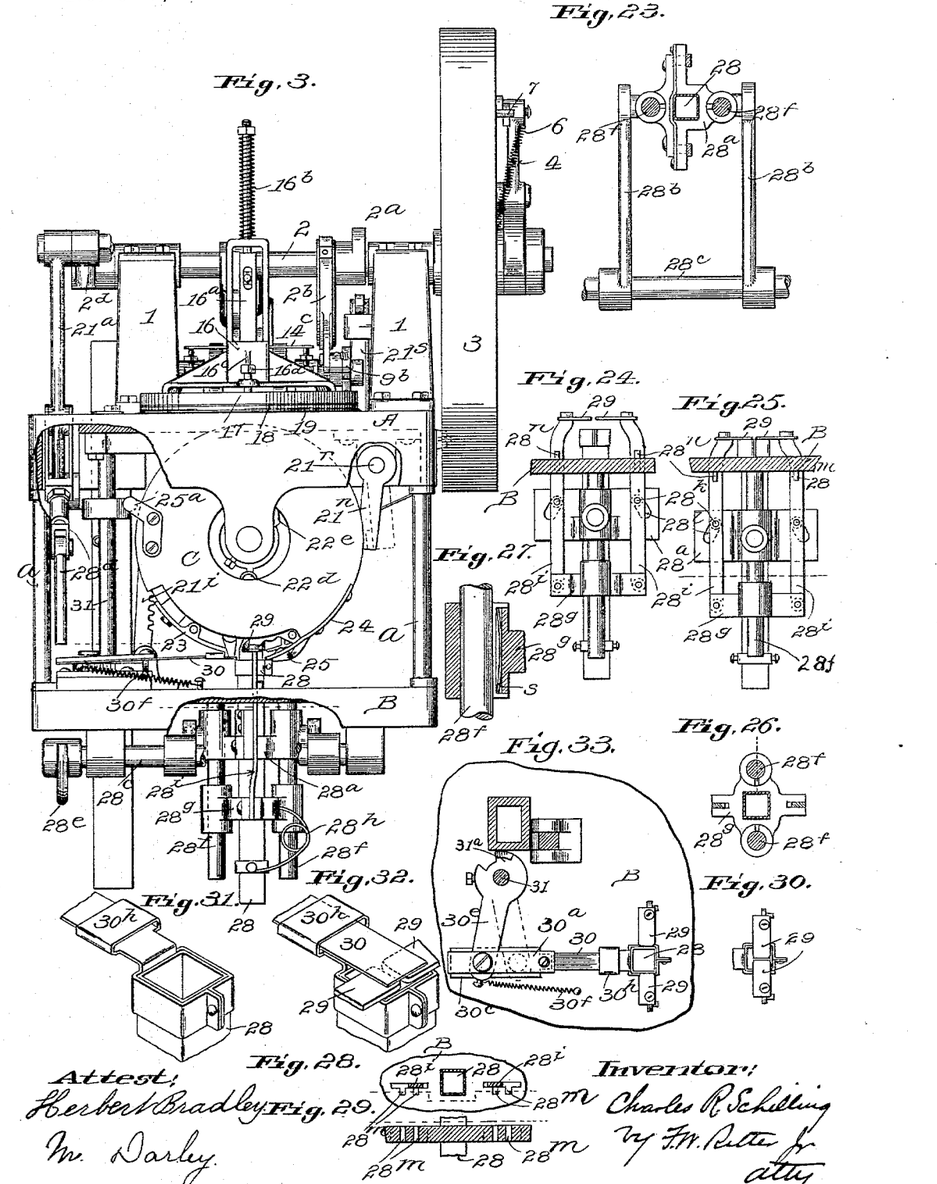

The construction and operation of the blades for giving the final fold and the reciprocating chute for receiving and discharging the wrapped article will best be understood by considering the two together, and for the rerelation of the parts in the machine special attention is called to Figs. 3, 5, and 6, while for the detail reference is had to Figs. 23 to 30, inclusive, Sheet 2.

Figure 54:
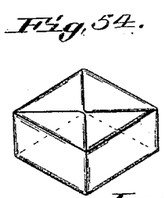

28 indicates a reciprocating or vibrating receiving and discharge chute, movable in a cross-head $28^a$, which cross-head is journaled on arms $28^b$, projecting from a rock-shaft $28^c$, said rock-shaft $28^c$ being actuated from shaft 2, through crank-arm $2^d$, lever or link $21^a$, adjustable link or lever $28^d$, and curved crank-arm $28^e$ on the said rock-shaft $28^c$. The cross-head $28^a$ moves freely on guide-rods $28^f$, which project downward from the base-plate B of the machine, and on said guide-rods, below said cross-head $28^a$, is a second cross-head $28^g$, which is held from free movement by the friction-spring $s$, (shown in Fig. 27, Sheet 2,) the chute 28 being yieldingly supported from this second cross-head $28^g$ by the spring-supports $28^h$, Fig. 3. Pivoted at their lower ends on said cross-head $28^g$ are two levers $28^i$, which pass up through slots in the base-plate B of the machine on either side of the chute 28 and terminate in horizontal folding-blades 29, the said levers $28^i$ having at points below the base-plate B pins $28^k$ working in inclined slots $28^l$ of the first or upper cross-head $28^a$, whereby said levers are made to approach each other as the cross-head $28^a$ starts down and carries the blades across the mouth of the pocket 22 of the wrapping-cylinder, and thus make the final fold, as indicated in Diagram 54, Sheet 7.

Taking up the folding operation where it was left off by the wrapping-cylinder, it will be remembered that the wrapper and contained article, in the reverse position from that shown in diagram 53, Sheet 7, had, by the operation of movable bottom $22^b$, been entered in the mouth of reciprocating chute 28. As the cross-head $28^a$ is raised by arms $28^b$ and rock-shaft $28^c$, (see Fig. 5, Sheet 4,) its first operation, through the medium of inclined slots $28^l$, acting on pins $28^k$, is to cause the separation of the folding-blades 29, thus unclosing the upper end of chute 28. When the pins $28^k$ have reached the bottom or outer ends of inclined slots $28^l$, the continued upward movement of the cross-head $28^a$ will carry with it the levers $28^i$ of the folding-blades, and these being pivotally connected with cross-head $28^g$, which cross-head supports or carries chute 28 through the medium of spring-supports $28^h$, (see Fig. 4, Sheet 4,) the chute 28 will be carried up toward the wrapping-cylinder to receive the partially-wrapped article discharged from the pocket thereof, the spring-supports $28^h$ yielding at the time of the reception of the article and allowing the chute to recede slightly or to move down through cross-head $28^g$ a short distance. Then, as cross-head $28^a$ moves down to the position indicated by the dotted lines in Fig. 6, Sheet 5, it will first cause the folding-blades 29 to approach or move across the open end of chute 28, thus making the final fold, and said folding-blades, in conjunction with the reaction of spring-supports $28^h$, which lift the chute 28, will force the wrapped article down into the chute, after which the chute will again move downward with cross-head $28^a$ and $28^g$, and said operation of the devices is repeated with each half-revolution of the wrapping-cylinder, or whenever a partially-wrapped article is to be received from the wrapping-cylinder.

In order to insure a positive movement of the final folding-blades 29, (see Figs. 24 and 25, Sheet 2,) the slots in base-plate B, through which levers $28^i$ (see Figs. 28 and 29, Sheet 2) pass, are elongated and provided with transverse feather-slots $28^m$ for guide-feathers $28^n$ (see Figs. 24 and 25) on said levers $28^i$, which feathers $28^n$ will pass through the outer feather-slots in ascending and the inner ones in descending, thus insuring the proper action of folding-blades 29.

In order to hold the final fold close to the wrapped article, (caramel or soap, as the case may be,) I provide a flexible blade 30 (see Fig. 3, Sheet 2, for location of blade, and Figs. 31, 32, and 33, same sheet, for details of construction) and also means for reciprocating and retaining said blade across the mouth of movable chute 28, (see Figs. 34 to 37, inclusive, Sheet 5,) which I will next describe.

The holding-blade 30, which should be flexible at its extremity, may be a single piece, if desired, or may be attached to a thicker buttbar $30^a$, and is secured to a slide $30^b$, movable in a guide $30^c$, secured to base-plate B, adjacent to and in line with the reciprocating chute 28. One connection between the blade 30 and slide $30^b$ is preferably a pin or post $30^d$, Fig. 36, on which is pivoted an arm $30^e$, Fig. 33, for retracting said slide and flexible blade, the forward (or other) motion of said blade being caused by a spring $30^f$ or its equivalent, the slide $30^b$ being at times locked against the action of said spring $30^f$, when said slide has been retracted by arm $30^e$ by means of a pin $30^g$, (see Figs. 36 and 37,) which enters a pin hole in guide $30^c$, for a purpose which will hereinafter appear. In order to insure the accurate movement of blade 30, a guide $30^h$ therefor (see Figs. 31, 32, and 32, Sheet 2) is secured to the chute 28. The arm $30^e$ above referred to is secured to a vertical rock-shaft 31 (see Figs. 3, 34, and 35) adjacent to vertically-reciprocating slide-bar 21$^b$, and is provided with a cam 31$^a$, arranged to be operated by a friction-roller 31$^b$ to rock the shaft 31 on the descent of the slide 21$^b$. In order to lift the vertical rock-shaft 31 at or near the completion of the upstroke of slide 21$^b$ and thus withdraw the pin 30$^g$, so that the spring 30$^c$ can throw the slide and its flexible blade 30, I provide a collar 31$^e$, adjustable on the said rock-shaft, which collar is engaged by the friction-roller 31$^b$, and to facilitate the drop of rock-shaft 31 I provide a spring 31$^f$. (See Fig. 6, Sheet 5, and Fig. 1.) It will be noted by reference to Figs. 5 and 6 that the holding-blade 30 receives its retracting movement from the descent of the vertical slide 21$^b$ through rock-shaft 31 and 30$^c$ (see also Fig. 33, Sheet 2) at the same time that the curved crank-arm 28$^e$ receives its movement from link or lever 21$^a$, which actuates the slide 21$^b$ and transmits said motion to the cross-head to retract the final folding-blades 29 and disclose the mouth or upper open end of movable chute 28, and that on the next or rising motion of vertical slide-bar 21$^b$, and near the close of its stroke, the rock-shaft 31 is lifted to release the slide and flexible blade 30 (after the folding-blades 29 have acted) and thus allow the spring 30$^f$ to project the flexible holding-blade 30 over the mouth of chute 28 and said folding-blades (see Fig. 32, Sheet 2) before the folding-blades 29 have been again retracted by the ascent of the cross-head 28$^a$.

Having fully described the construction of the several parts and incidentally thereto the operation of said parts and their combinations, it is only now necessary to give a general statement of the operation of the machine as a whole.

Referring to Sheet 4 it will be noted that the machine being set in motion the feed-rollers 9 9 and 10 10, intermittently actuated by the eccentric 2$^b$, will draw the paper strip from roll P, spread it flat, and deliver it past the rotary disk 15, beneath the spring presser-plate 14, and under the feed-wheel 17, and that pocket 17$^c$ thereof, which for the time being registers with ram 16$^a$, it being maintained in said position by the presser-plate 14 and leaf-spring 14$^a$, Fig. 43, Sheet 5, during the severing of the wrapper from the strip. With the cessation of the paper-feed the double cam 2$^c$ causes the descent of the spring presser-plate 14 and the cam 15$^g$ (see Figs. 4 and 12, Sheet 3) causes the operative travel of the rotary disk 15 by the intermediate mechanism hereinbefore specified. At or about the time the disk 15 ceases to operate the second cam-surface on double cam 2$^c$ operates the feed-plunger or ram 16$^a$ (see Fig. 7, Sheet 4) to force the article (caramel or like article) from the pocket 17$^c$ of the feed-wheel and the severed wrapper beneath the same into that folding-pocket 22 (see Sheet 6) which for the time being registers with the ram 16$^a$. At the time of the cutting operation before specified the movable bottom 22$^b$ of the pocket 22 of the folding-cylinder has, by means of cam 22$^e$, acting on roller 22$^d$ on the stem of said bottom, (see Figs. 14 and 15, Sheet 6,) been forced beyond the periphery of the folding-cylinder to such an extent as to support the wrapper and the article resting thereon, so that they are held between the descending ram 16$^a$ and the movable bottom 22$^b$, the bottom receding with the advance of the ram, the same being permitted by the friction-spring 22$^c$, which bears on the stem of the movable pocket. At this time the ram is withdrawn by the operation of spring 16$^b$ (see Fig. 7, Sheet 4) or its equivalent, the spring presser-plate 14 is released by cam 2$^c$, the wrapping-cylinder is released by the withdrawal of dog or pawl 21$^n$ (see Fig 2, Sheet 1, Fig. 3, Sheet 2, Fig. 11, Sheet 3) through the operation of cam 2$^a$, and the movement of the paper feed-rollers 9 9 and 10 10, the feed-wheel 17, and the folding-cylinder 21 commence to bring into position another wrapper, article to be wrapped, and folding-pocket. At the same time the vibration of finger 15$^i$ on rock-shaft 20 (see Fig. 2, Sheet 1, and Fig. 4, Sheet 3) causes the return or idle stroke of the rotary disk 15. In this movement of the folding-cylinder, (in the present instance, one half-revolution,) which is necessary to bring the next folding-pocket 22 beneath the ram 16$^a$, the cylinder carries with it the article to be wrapped, said article inclosed on three sides by the wrapper; and during said motion the slides 23 and 24 and the folding-fingers 25, 26 and 27 (the fingers being in duplicate for opposite ends of the package) are successively operated to make the several folds of the wrapper (see Figs. 48, 49, 51, 52, and 53, Sheet 7) in manner as hereinbefore fully pointed out at the time said folding-fingers were described.

At the close of the half-revolution of the wrapping-cylinder 21, which brings the pocket and contained article opposite to its first position or to the point of delivery, the stem of movable bottom 22$^b$ is struck by tappet 22$^f$ on the return movement of rock-shaft 20, (see Fig. 15, Sheet 6,) which brings the bottom of the pocket to the periphery of the wrapping-cylinder, and thus projects the article within the range of the folding-blades 29, (see all the figures on Sheet 2, and also Fig. 6 of Sheet 5,) at which time the movable chute 28 has been raised to receive the wrapped article and the folding-blades 29 29 and holding-blade 30 have been withdrawn to disclose the mouth of chute 28, all being done by mechanism the construction and operation of which has been pointed out.

The wrapping-cylinder 21, having made one half-revolution, stops, and another wrapper or article to be wrapped is fed into the pocket, which has registered with the ram, and about the same time the wrapped article in the lowest pocket is taken out as follows: With the initial downward movement of the cross-head 28ª (see Fig. 6, Sheet 5, and Figs. 24 and 25, Sheet 2,) the folding-blades 29 close across the mouth of the chute 28 and make the final fold, (see Fig. 54, Sheet 6,) which completes the wrapping operation. The continued downward movement of the cross-head 28ª carries with it the folding-blades 29 29 until the wrapped article is taken from the pocket 22 and is forced fully within the chute, and then causes the descent of chute 28.

During the operation of the devices as last set forth, the ascent of slide-bar 21ᵇ (see Fig. 6, Sheet 5) has, through antifriction-roller 31ᵇ and collar 31ᶜ on shaft 31, lifted shaft 31 and with it arm 30ᵉ, thus withdrawing pin 30ᵍ (see Figs. 36 and 37, Sheet 5) and permitting spring 30ᶠ (see Figs. 32 and 33, Sheet 2) to project holding-blade 30 across the mouth of chute 28 and over the folding-blades 29, where it remains until the next upward movement of the chute and the next article is ready to enter said chute. This completes the operation of the machine considered as a whole, the several steps being continuously repeated during the running of the machine and the wrapped articles being passed through the chute and delivered regularly by the movement of the chute in a manner to greatly facilitate the counting and packing operations.

Having thus described my invention, what I claim, and desire to secure by Letters Patent, is—

1. The combination with a power shaft, of a drive wheel loosely journaled thereon, a spring lever mounted on the drive wheel, and an arm secured to the power shaft with which the spring lever of the drive wheel engages for transmitting the power from the wheel to the shaft, substantially as and for the purposes specified.

2. The combination with a power shaft, of a drive-wheel loosely journaled thereon, a yielding lever for transmitting the power from the drive-wheel to the shaft, and an automatic stop mechanism to arrest and retain the pivoted lever when it has passed its normal position; substantially as and for the purposes specified.

3. In a machine for feeding coated or waxed paper, the combination of spirally milled feed rolls, and means for actuating the same; substantially as and for the purposes specified.

4. In a machine for feeding waxed or coated paper, the combination of spirally milled feed rollers, set at an inclination to each other, and means for actuating said rolls; substantially as and for the purposes specified.

5. In a machine for severing coated or waxed paper, the combination with a reciprocating dull-edge crusher disk, of a yieldingly supported presser plate, and means for bringing the yieldingly supported presser plate into action with the dull-edge crusher disk, substantially as and for the purposes specified.

6. The combination in a paper severing mechanism, of a spring supported presser plate, a cam mechanism for bringing the presser plate into action, a reciprocating rotary crushing disk arranged in line and coacting with the face of the presser plate, and means for actuating the crushing disk; substantially as and for the purposes specified.

7. The combination with a rotary crushing disk, of a reciprocating slide on which said disk is mounted, a pivoted arm for actuating the slide, a cam, and a vibrating tappet finger for actuating the arm, a yielding presser plate for co-acting with the crushing disk, and means for bringing the presser plate and crushing disk in operative contact; substantially as and for the purposes specified.

8. The combination in a paper feeding and severing mechanism, of spirally milled feed rolls for feeding the paper flat, a reciprocating crushing disk, a yielding presser plate to co-act with the disk, and means for actuating the rolls, disk and presser plate, substantially as and for the purposes specified.

9. The combination in a paper feeding and severing mechanism, of milled feed rolls arranged at an inclination to each other, for keeping the paper spread as it passes to the crushing disk, a reciprocating crushing disk, a yielding presser plate to co-act with the disk, and means for actuating said rolls, disk and presser plate; substantially as and for the purposes specified.

10. The combination in a paper feeding and severing mechanism, of spirally milled feed rolls, for spreading the paper and feeding it flat, a leaf tongue which rests upon the paper and prevents it from shifting under the operation of the crushing disk, a reciprocating crushing disk, a yielding presser plate which co-acts with the disk, and means for actuating the feed-rolls, presser plate and disk; substantially as and for the purposes specified.

11. The combination with a wrapping cylinder having wrapping pockets in its periphery, and a rock shaft on which the wrapping cylinder is mounted, of a rotary feed wheel having a series of pockets and adjacent pin holes, a spring actuated locking pin arranged to engage in the pin holes of the feed-wheel, a slide for retracting the spring actuated pin, and means on the rock shaft of the wrapping cylinder for actuating the slide, substantially as and for the purposes specified.

12. The combination with a wrapping cylinder having pockets in its periphery and a rock shaft on which the wrapping cylinder is loosely mounted, of means for imparting an intermittent rotary movement to the wrapping cylinder, a feed wheel having a series of pockets and pin holes concentrically arranged therein, a spring actuated locking pin arranged to engage in said pin holes, a slide for retracting the spring actuated pin, and a tappet arm on the rock shaft of the wrapping cylinder for actuating said slide; substantially as and for the purposes specified.

13. In a wrapping machine, the combination with a wrapping cylinder of a rotary feed table having concentrically arranged pockets, pin holes, and ratchet wheel, of a spring actuated locking pin arranged to engage in the pin holes of the feed table, a slide arranged to retract the locking pin and provided with a pawl which engages the ratchet wheel of the feed table, and means for actuating the slide from the shaft of the wrapping cylinder; substantially as and for the purposes specified.

14. In a machine for feeding waxed or coated paper, the combination of a plurality of spirally milled feed rolls arranged to engage, some of said feed rolls having a yielding support, and means for actuating said rolls, substantially as and for the purposes specified.

15. In a wrapping machine, the combination with a wrapping cylinder having a pocket in its periphery, of reciprocating slides mounted on the periphery of said cylinder one on each side of said pocket, tuckers mounted on and movable with said reciprocating slides, two pairs of pivoted folding fingers one pair on each side of said cylinder and adjacent to the pocket, and means for successively actuating the slides, tuckers, and folding fingers, substantially as and for the purposes specified.

16. In a wrapping machine, the combination with a wrapping cylinder having a pocket in its periphery to receive the wrapper and the article to be wrapped, of a reciprocating folding slide on the periphery of the cylinder adjacent to said pocket, tuckers or third fold fingers mounted on the reciprocating slide, and means for actuating the slide and fingers; substantially as and for the purposes specified.

17. In a wrapping machine, the combination with a wrapping cylinder having a pocket in its periphery for the reception of a wrapper and article to be wrapped, of a movable bottom arranged in said pocket and provided with a stem or rod, a friction spring which bears on the said stem, and a tappet arranged to act on the end of said stem; substantially as and for the purposes specified.

18. In a wrapping machine, the combination with a wrapping cylinder having a pocket in its periphery, of a movable bottom arranged in said pocket and provided with a stem or rod, a lateral projection on said stem or rod, a tappet arranged to act on the end of said stem, a cam arranged to act on the lateral projection on said stem, and a friction spring which bears on said stem; substantially as and for the purposes specified.

19. In a wrapping machine, the combination with a wrapping cylinder having a pocket in its periphery, of the peripheral slides 23 and 24, duplicate spring actuated fingers 25 pivoted on one of said slides, the duplicate fingers 26, 26, and 27, 27, pivoted near the inner corners of the pockets, and the cam disk, C, C', having the cam tracks 23$^b$, 27$^b$ and 24$^b$, 26$^b$; substantially as and for the purposes specified.

20. In a wrapping machine, the combination of a plunger or feed ram, a wrapping cylinder having a pocket provided with a movable bottom, an interposed feed-wheel, and means for projecting the movable bottom of the wrapping pocket beyond the periphery of the wrapping cylinder and close to the feed-wheel to secure the wrapper and article to be wrapped and prevent the wrapper from shifting, substantially as specified.

21. In a wrapping machine, the combination of a feed-plunger or ram, a wrapping cylinder having notches in its periphery, an interposed feed-wheel having holes for a locking pin, a locking pin, a pawl or dog arranged to engage the notches in the periphery of the wrapping cylinder, and means for actuating said locking pin and pawl or dog; substantially as and for the purposes specified.

22. In a wrapping machine the combination of a feed plunger or ram, a wrapping cylinder having pawl notches in its periphery, a spring controlled rock shaft provided with a dog or pawl to engage the notches in the periphery of the cylinder, and a shaft provided with cams for actuating the feed plunger or ram and the rock shaft which carries the pawl, substantially as and for the purposes specified.

23. In a wrapping machine, the combination with a rock-shaft, of a wrapping cylinder loosely mounted thereon, a slide, a rock-arm which connects the slide and rock-shaft, a pivoted rack, and interposed pinion and ratchet mechanism for actuating the wrapping cylinder; substantially as and for the purposes specified.

24. In a wrapping machine, a wrapping cylinder provided with a pocket having a movable bottom, a rock-shaft on which the wrapping cylinder is loosely mounted said rock shaft having tappets to actuate the movable bottom of the wrapping cylinder, a slide, a rock-arm which connects the slide and rock-shaft, a pivoted rack, and an interposed pinion and pawl and ratchet mechanisms for actuating the wrapping cylinder; substantially as and for the purposes specified.

25. In a wrapping machine, the combination with a rock-shaft and the crank arm by which it is actuated, of a pivoted rack, a pinion carried by the crank arm of the rock-shaft, a gear wheel on the rock-shaft, a wrapping cylinder loosely mounted on the rock-shaft, and intermediate pawl and ratchet mechanism for actuating the wrapping cylinder; substantially as and for the purposes specified.

26. In a wrapping machine, the combination with a wrapping cylinder, of a movable receiving chute, and independently vibrating folding blades arranged to operate between the wrapping cylinder and chute, substantially as and for the purposes specified.

27. In a wrapping machine, the combination with a wrapping cylinder, of a yieldingly supported or rebounding chute and means for moving the chute to and from the wrapping cylinder; substantially as and for the purposes specified.

28. In a wrapping machine, the combination with a wrapping cylinder, of a movable receiving chute, folding blades arranged to operate between said chute and the wrapping cylinder, a holding blade for controlling the final folds of the wrapper, and means for advancing and retracting the folding blades and holding blade; substantially as and for the purposes specified.

29. In a wrapping machine, the combination with a wrapping cylinder, of a receiving chute, a cross-head, guides on which said cross-head has a frictional bearing, levers pivoted on said frictionally held cross-head, said levers having folding blades arranged to operate between the chute and wrapping cylinder, a cross-head loosely movable on the chute and on said guides and provided with means to actuate the levers of the folding blades, and means for reciprocating the loose cross-head and the chute, substantially as and for the purposes specified.

30. In a wrapping machine, the combination with a reciprocating chute, of a cross-head, guides on which said cross-head has a frictional bearing, a yielding spring connection between said cross-head and chute, a cross-head loosely movable on the chute and guides, levers having folding blades said levers pivoted on the first named or frictional cross-head, and actuated by the loose cross-head, and means for reciprocating the loose cross-head; substantially as and for the purposes specified.

31. In a wrapping machine, the combination with pivoted reciprocating levers having folding blades and feathers, of feather slots for controlling the movements of the levers, and means for reciprocating said levers; substantially as and for the purposes specified.

32. In a wrapping machine, the combination with a receiving chute, of a flexible blade, a rock shaft and arm for retracting said blade, a spring for projecting said blade across the chute, and means for actuating the rock shaft intermittently; substantially as and for the purposes specified.

33. In a wrapping machine, the combination of a receiving chute, a blade arranged to move across the mouth of the chute, a rock-shaft and arm for retracting the blade, a pin for locking the blade in its retracted position, a spring for projecting the blade across the chute, and means for releasing the blade and allowing the spring to operate, substantially as and for the purposes specified.

34. In a wrapping machine, the combination with a movable receiving chute, of an independent reciprocating flexible blade arranged to open and close the receiving end of said chute, and means for actuating the chute and blade; substantially as and for the purposes specified.

35. In a wrapping machine, the combination with a receiving chute, of a reciprocating blade, a slide therefor, a rock-shaft having an arm to retract the slide and a pin adapted to lock the slide and arm, a spring to project the slide, a cam and a collar on the rock-shaft, and a slide bar having a projection arranged to alternately engage the cam and collar of the rock-shaft; substantially as and for the purposes specified.

In testimony whereof I affix my signature, in presence of two witnesses, this 27th day of August, 1894.

CHARLES R. SCHILLING.

Witnesses:
FRANK M. BLACK,
W. J. MANNERING.